United States Patent
Stubner et al.

(10) Patent No.: US 8,749,186 B2
(45) Date of Patent: Jun. 10, 2014

(54) CIRCUIT ARRANGEMENT FOR OPERATING AN ELECTRIC MOTOR

(75) Inventors: Armin Stubner, Buehl-Altschweier (DE); Norbert Martin, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 13/500,375

(22) PCT Filed: Aug. 6, 2010

(86) PCT No.: PCT/EP2010/061467
§ 371 (c)(1),
(2), (4) Date: Jun. 27, 2012

(87) PCT Pub. No.: WO2011/042235
PCT Pub. Date: Apr. 14, 2011

(65) Prior Publication Data
US 2012/0256506 A1    Oct. 11, 2012

(30) Foreign Application Priority Data
Oct. 5, 2009 (DE) .......................... 10 2009 045 328

(51) Int. Cl.
*H02P 1/04* (2006.01)
*H02P 5/00* (2006.01)

(52) U.S. Cl.
USPC ...... 318/443; 318/139; 318/DIG. 2; 318/437; 318/466

(58) Field of Classification Search
USPC .................. 15/250.16, 250.17; 318/443, 139, 318/DIG. 2, 437, 466
See application file for complete search history.

(56) References Cited

U.S. PATENT DOCUMENTS

| | | | | |
|---|---|---|---|---|
| 3,593,090 A | * | 7/1971 | Kearns | 318/444 |
| 3,603,858 A | * | 9/1971 | Ugo | 318/443 |
| 4,544,870 A | * | 10/1985 | Kearns et al. | 318/444 |
| 4,733,147 A | * | 3/1988 | Muller et al. | 318/443 |
| 5,723,924 A | | 3/1998 | Blanchet | |
| 6,335,601 B1 | * | 1/2002 | Kato et al. | 318/444 |
| 6,366,044 B2 | * | 4/2002 | Okai et al. | 318/445 |
| 6,609,266 B1 | * | 8/2003 | Satoh et al. | 15/250.13 |

FOREIGN PATENT DOCUMENTS

DE  10157386  6/2003
EP  0397339  11/1990

OTHER PUBLICATIONS

PCT/EP2010/061467 International Search Report dated Mar. 30, 2011 (Translation and Original, 4 pages).

* cited by examiner

*Primary Examiner* — Erick Glass
(74) *Attorney, Agent, or Firm* — Michael Best & Friedrich LLP

(57) ABSTRACT

The invention relates to a circuit arrangement for operating an electric motor, in particular an electric motor for a windshield wiper. The electric motor has a first voltage connection, a ground connection, and a return connection. The ground connection is connected to a battery ground connection of a battery. Furthermore, a switch is provided, which is designed to open or disconnect a conductive connection between the ground connection and the return connection depending on an angle position of a shaft driven by the electric motor. Additionally, a filter member is arranged between the return connection and the ground connection.

4 Claims, 6 Drawing Sheets

CIRCUIT ARRANGEMENT FOR OPERATING AN ELECTRIC MOTOR

BACKGROUND OF THE INVENTION

The invention relates to a circuit arrangement for operating an electric motor.

Electric motors are known in a multiplicity of designs and are used in various technical fields. In motor vehicles, electric motors are used for driving windshield wipers, for example. It is known that electric motors emit electromagnetic interference on account of the electrical and magnetic fields which arise inside them and which vary over time. It is likewise known practice to reject such interference in the useful ranges of the electromagnetic spectrum by using filter elements. The increasingly continuous use of the electromagnetic spectrum by new applications, such as digital radio broadcasting, means an increase in the demands on the electromagnetic compatibility (EMC) of technical appliances. In this case, the focus is on rarely but regularly recurring interference pulses in relatively high frequency ranges. It has been found that such interference pulses are not adequately rejected by the measures known hitherto in the case of wiper motors.

SUMMARY OF THE INVENTION

It is therefore an object of the present invention to provide an improved circuit arrangement for operating an electric motor which meets increased EMC demands.

In a circuit arrangement according to the invention for operating an electric motor, particularly an electric motor for a windshield wiper, the electric motor has a first voltage connection, a ground connection and a return line connection. In this case, the ground connection is connected to a battery ground connection on a battery. In addition, a switch is provided which is designed to open or break a conductive connection between the ground connection and the return line connection on the basis of an angular position of a shaft driven by the electric motor. Furthermore, the return line connection and the ground connection have a filter element arranged between them. Advantageously, this filter element eliminates or reduces high-frequency interference pulses from the switch. As a result, the circuit arrangement also meets intensified EMC demands.

Preferably, the filter element is in the form of a capacitive electrical component. Theoretical considerations and experimental trials have shown that such a filter element brings about advantageous rejection of electromagnetic interference.

With particular preference, the filter element is a capacitor having a capacitance of between 1 nF and 100 nF. Advantageously, this capacitance range has been found to be particularly effective.

Expediently, the electric motor is in the form of a rotary motor. Such electric motors are highly suited to driving windshield wipers.

According to one embodiment of the circuit arrangement, the electric motor has a limit stop connection which is connected to a battery voltage contact, wherein the internal switch is designed to connect the return line connection either to the ground connection or to the limit stop connection on the basis of the angular position of the shaft. Advantageously, the filter element then rejects electromagnetic interference pulses caused by the periodic toggling.

BRIEF DESCRIPTION OF THE DRAWINGS

The invention will be explained in more detail with reference to the appended figures. In the figures, standard reference symbols are used for elements which are the same or have the same effect, and.

DETAILED DESCRIPTION

Figure 1:
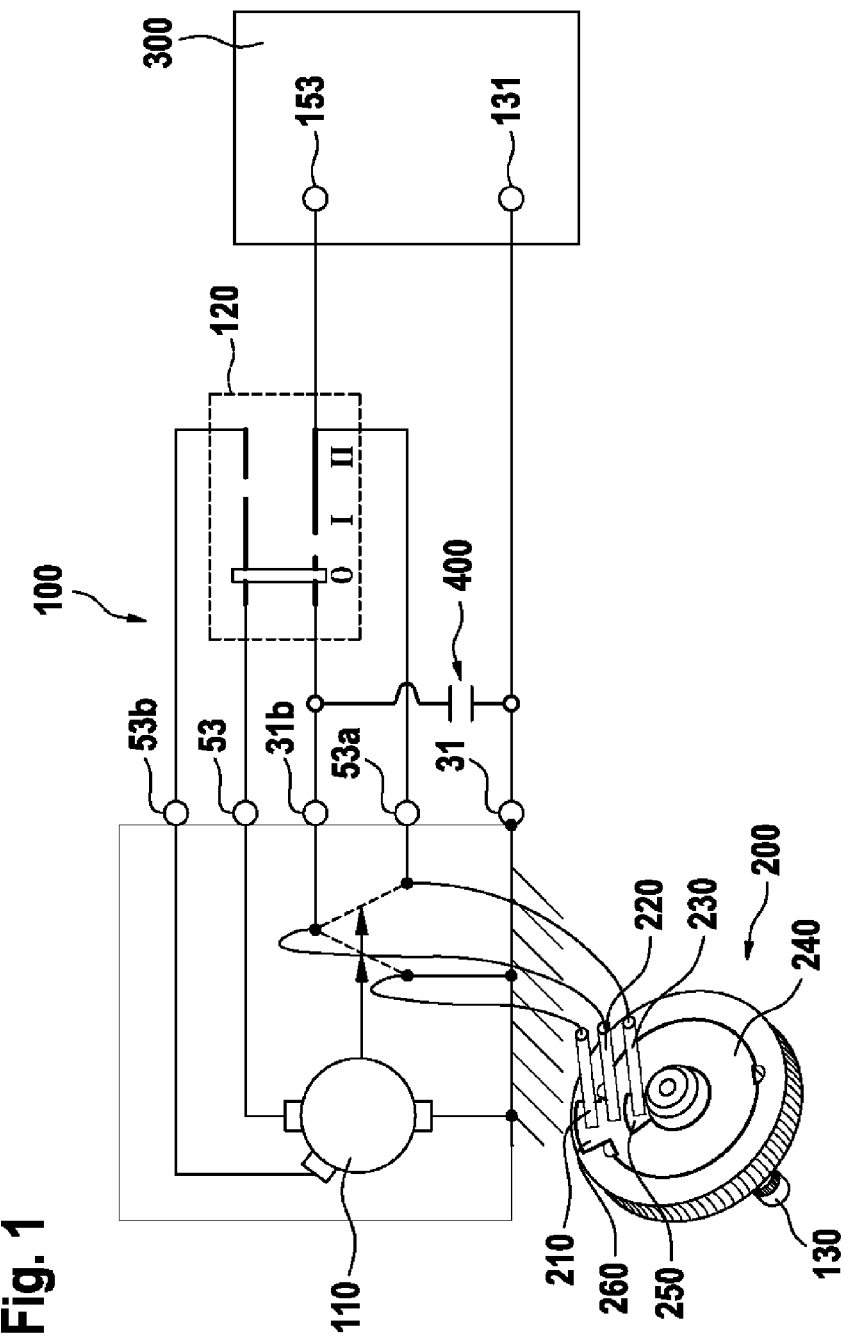
FIG. 1 shows a schematic illustration of a circuit arrangement based on a first embodiment.

FIG. 1 shows a schematic illustration of a circuit arrangement 100 based on a first embodiment. The circuit arrangement 100 is used for operating an electric motor 110, which, by way of example, may be provided for the purpose of driving a windshield wiper on a motor vehicle. The motor 110 has a first voltage connection 53 and a second voltage connection 53b. Furthermore, the motor 110 has a ground connection 31, which may be connected to a housing of the motor 110 or to a housing of the circuit arrangement 100. The circuit arrangement 100 additionally has a return line connection 31b and a limit stop connection 53a.

The circuit arrangement 100 is connected to a battery 300 which has a battery voltage contact 153 and a battery ground connection 131. The ground connection 31 is connected to the battery ground connection 131. The limit stop connection 53a is connected to the battery voltage contact 153.

In addition, an internal switch 200 is provided. The internal switch 200 comprises a disk-shaped parking position disk 240 which is rigidly connected to a shaft 130 driven by the motor 110. The shaft 130 may be a shaft of the motor 110 or a shaft of a transmission driven by the motor 110. Rotation of the shaft 130 brings about rotation of the parking position disk 240 about an axis perpendicular to the parking position disk 240. The parking position disk 240 has an essentially disk-shaped contact region 270 arranged on it centrally about the axis of rotation of the parking position disk 240. The contact region 270 is electrically conductive and may be in the form of a metal coating on the parking position disk 240, for example. In a narrow angular range of the contact region 270, the contact region 270 has a contact interruption 250 in a radially inner section of the contact region 270 and has a contact extension 260 in a radially outer section of the contact region 270.

A first sliding contact 210, a second sliding contact 220 and a third sliding contact 230 are in contact with the parking position disk 240. The first sliding contact 210 is electrically conductively connected to the ground connection 31. The second sliding contact 220 is electrically conductively connected to the return line connection 31b. The third sliding contact 220 is electrically conductively connected to the limit stop connection 53a. The sliding contacts 210, 220, 230 are arranged on the parking position disk 240 such that in almost all angular positions of the parking position disk 240 the second sliding contact 220 and the third sliding contact 230 are electrically conductively connected to one another via the contact region 270, and the first sliding contact 210 is electrically insulated from the second sliding contact 220 and from the third sliding contact 230. Only in a narrow angular position range of the parking position disk 240 is the first sliding contact 210 arranged above the contact extension 260 and the third sliding contact 230 arranged above the contact interruption 250. In this angular position of the parking position disk 240, the first sliding contact 210 is conductively connected to the second sliding contact 220, while the third sliding contact 230 is electrically insulated from the first sliding contact 210 and from the second sliding contact 220.

In one alternative embodiment, the internal switch 200 may also be in a different form. It is merely critical that the internal switch 200 connects the return line connection 31b either to the ground connection 31 or to the limit stop connection 53a on the basis of the angular position of the shaft 130.

In addition, the circuit arrangement 100 has a steering column switch 120 which is provided for the purpose of switching on, switching off and toggling the windshield wiper. By way of example, the steering column switch 120 may be arranged in a passenger compartment of the motor vehicle. The steering column switch 120 can adopt three different positions. In a first position I, the steering column switch 120 connects the first voltage connection 53 to the battery voltage contact 153. In a second position II, the steering column switch 120 connects the battery voltage contact 153 to the second voltage connection 53b. In a third position O, the steering column switch 120 connects the first voltage connection 53 to the return line connection 31b. This position of the steering column switch 120 is shown in FIG. 1.

When the steering column switch is in position I, the first voltage connection 53 of the motor 110 is connected to the battery voltage contact 153. The ground connection 31 of the motor 110 is connected to the battery ground connection 131. As a result, the motor 110 runs at a first speed and drives the windshield wiper connected to it at a first wiping speed. When the steering column switch 120 is in position II, the second voltage connection 53b of the motor 110 is connected to the battery voltage contact 153, and the ground connection 31 of the motor 110 is connected to the battery ground connection 131. In this position of the steering column switch 120, the motor 110 runs at a second speed and drives the windshield wiper connected to the motor 110 at a second wiping speed. The second speed may be higher than the first speed, for example. In certain embodiments of the circuit arrangement 100, the second position II of the steering column switch 120 and the second voltage connection 53b of the motor 110 may also be dispensed with. In this case, the motor 110 can be operated only at one speed. In further embodiments, the motor 110 may also have further voltage connections in order to operate the motor 110 at further speeds. In this embodiment, the steering column switch 120 accordingly has further switching positions.

When the steering column switch 120 is moved from position I or from position II to position O, the parking position disk 240 of the internal switch 200 is generally in an angular position in which the second sliding contact 220 is conductively connected to the third sliding contact 230, and the first sliding contact 210 is insulated from the second sliding contact 220 and the third sliding contact 230. As a result, the first voltage connection 53 of the motor 110 is connected to the return line connection 31b by means of the steering column switch 120, the return line connection 31b is connected to the limit stop connection 53a by means of the second sliding contact 220 and the third sliding contact 230 of the internal switch 200, and the limit stop connection 53a is connected to the battery voltage contact 153. In addition, the ground connection 31 of the motor 110 is also connected to the battery ground connection 131. Subsequently, the motor 110 continues to run at the first speed until the parking position disk 240 of the internal switch 200 has reached that angular position in which the first sliding contact 210 is electrically conductively connected to the second sliding contact 220, and the third sliding contact is electrically insulated from the first sliding contact 210 and the second sliding contact 220. In this angular position of the parking position disk 240, the first voltage connection 53 of the motor 110 is connected to the return line connection 31b by means of the steering column switch 120, and the return line connection 31b is connected to the ground connection 31 by means of the first sliding contact 210 and the second sliding contact 220 of the internal switch 200. In addition, the ground connection 31 of the motor 110 is connected to the battery ground connection 131. In this angular position of the parking position disk 240 of the internal switch 200, the first voltage connection 53 of the motor 110 is therefore pulled to ground, which stops the motor 110. The associated angular position of the parking position disk 240 has been chosen such that it is obtained when the windshield wiper driven by the motor 110 is in a parking position. When the steering column switch 120 is moved from position I or from position II to position O, the motor 110 and the windshield wiper driven by it therefore initially continue to run until the windshield wiper reaches a parking position. In the parking position, the motor 110 is switched off.

In positions I and II of the steering column switch 120, the parking position disk 240 is rotated by the shaft 130. As a result, during normal operation of the motor 110, the internal switch 200 connects the return line connection 31b alternately to the ground connection 31 and to the limit stop connection 53a connected to the battery voltage contact 153. Such toggling takes place periodically upon every revolution of the parking position disk 240. Subsequently, the return line connection 31b and lines connected to the return line connection 31b experience periodic short voltage pulses.

In accordance with the invention, it has been recognized that these voltage pulses produce wideband noise in a frequency range up to several hundred MHz. Therefore, a filter element 400 is arranged between the return line connection 31b and the ground connection 31. Preferably, the filter element 400 is a capacitive filter element, for example a capacitor. The capacitance of the capacitor should preferably be in a range between 1 nF and 100 nF. However, the capacitance of the filter element 400 can also be chosen to be lower or higher. The optimum capacitance value should be determined experimentally. Preferably, the filter element 400 should be arranged as close as possible to the sliding contacts 210, 220, 230 of the internal switch 200. If the internal switch 200 is of a different design than that described, the filter element 400 should nevertheless be provided as close as possible to the internal switch 200. It has been found that the filter element 400 improves the emission spectrum of the circuit arrangement 100 and of the motor 110 in a very advantageous manner.

Figure 2:
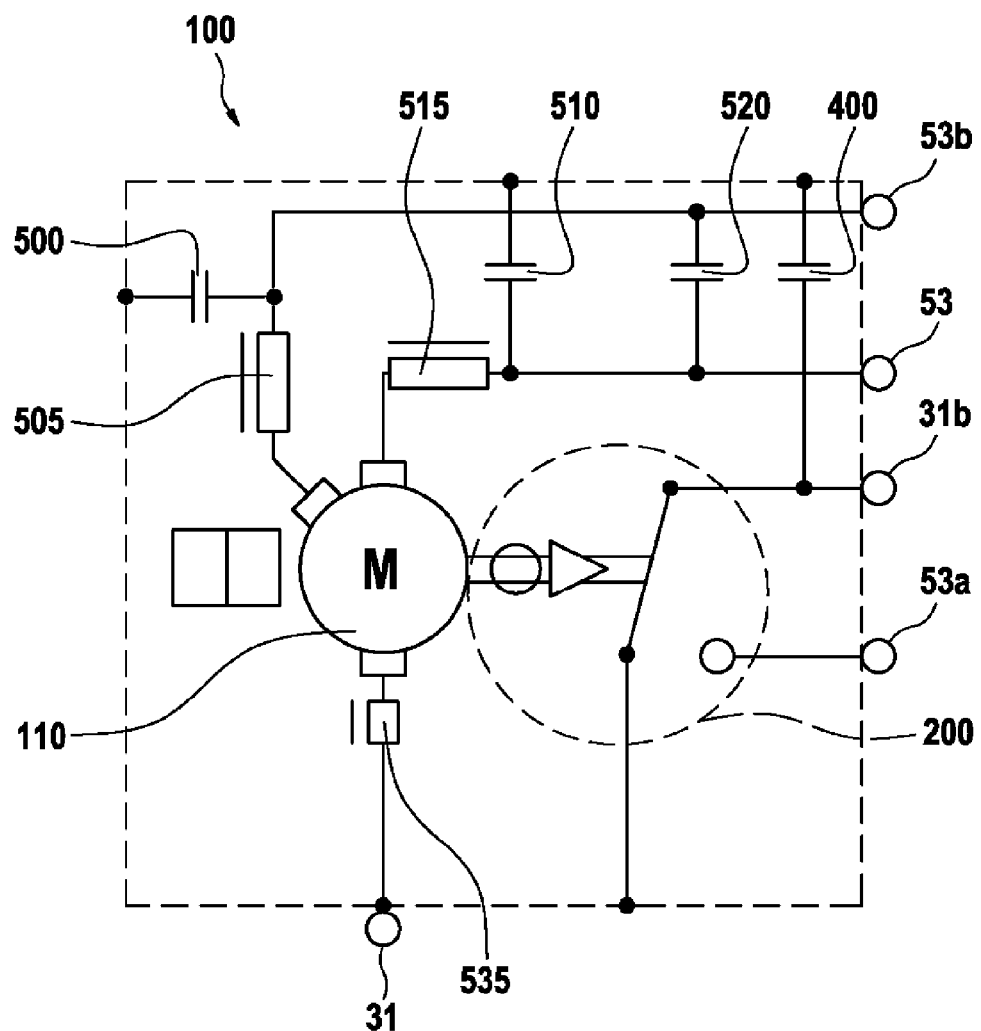
FIG. 2 shows a further illustration of the circuit arrangement based on the first embodiment.

FIG. 2 shows a further view of the circuit arrangement 100. Components which correspond to those in FIG. 1 are denoted via the same reference symbols. FIG. 2 shows that the circuit arrangement 100 may have further interference suppression elements. Thus, the second voltage connection 53b and the ground connection 31 have a first capacitor 500 arranged between them. The motor 110 and the second voltage connection 53b have a first inductor 505 arranged between them. The first voltage connection and the ground connection 31 have a second capacitor 510 arranged between them. The motor 110 and the first voltage connection 53 have a second inductor 515 arranged between them. In addition, the first voltage connection 53 and the second voltage connection 53*b* have a third capacitor 520 arranged between them. The motor 110 and the ground connection 31 have a third inductor 535 between them. The provision of the capacitors 500, 510, 520 and the inductors 505, 515, 535 is already known from the prior art.

Figure 3:
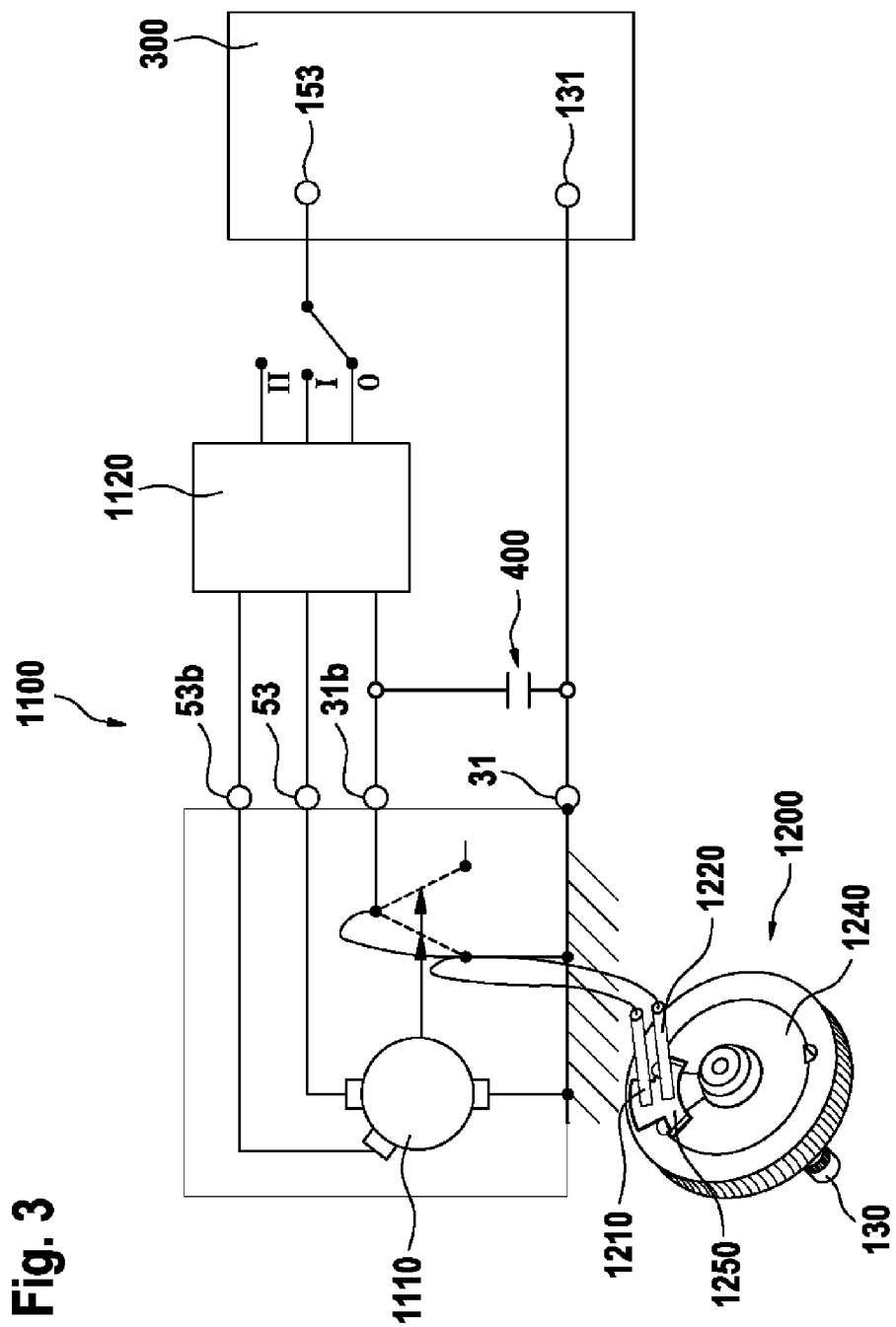
FIG. 3 shows a schematic illustration of a circuit arrangement based on a second embodiment.

FIG. 3 shows a circuit arrangement 1100 based on a second embodiment. The circuit arrangement 1100 is used for operating an electric motor 1110, which may likewise be a motor for driving a windshield wiper on a motor vehicle, for example. The motor 1110 again has a first voltage connection 53, a second voltage connection 53*b* and a ground connection 31. In addition, a return line connection 31*b* is again provided.

The motor 1110 has an internal switch 1200, which again comprises a parking position disk 1240 which is rotated by a shaft 130. A first sliding contact 1210 and a second sliding contact 1220 are in contact with the parking position disk 1240. The parking position disk 1240 has a contact area 1250 arranged on it which electrically conductively connects the first sliding contact 1210 to the second sliding contact 1220 in a particular angular position of the parking position disk 1240. In all other angular positions of the parking position disk 1240, the first sliding contact 1210 and the second sliding contact 1220 are electrically insulated from one another. The first sliding contact 1210 is electrically conductively connected to the ground connection 31. The second sliding contact 1220 is electrically conductively connected to the return line connection 31*b*. The internal switch 1200 may also be of a different design, but should make or break a conductive connection between the ground connection 31 and the return line connection 31*b* on the basis of the angular position of the shaft 130. In particular, the internal switch 1200 may also be designed such that the first sliding contact 1210 is insulated from the second sliding contact 1220 only in one particular angular position of the parking position disk 1240 and is electrically conductively connected to the second sliding contact 1220 in all other angular positions of the parking position disk 1240.

Again, a battery 300 is provided which has a battery voltage contact 153 and a battery ground connection 131. The battery ground connection 131 is connected to the ground connection 31.

The circuit arrangement 1100 also comprises a controller 1120. By way of example, the controller 1120 may be in the form of a microcontroller or microcomputer. The controller 1120 may also be integrated in another controller in a motor vehicle. The controller 1120 is connected to the battery voltage contact 153 of the battery 300. In addition, the controller 1120 is connected to the first voltage connection 53, to the second voltage connection 53*b* and to the return line connection 31*b*. The controller 1120 can adopt different switching positions. By way of example, the switching positions can be prescribed for the controller 1120 by a steering column switch which is connected to the controller 1120. In a first position I, the controller 1120 connects the battery voltage contact 153 to the first voltage connection 53 of the motor 1110. As a result, the motor 1110 runs at a first speed and drives the windshield wiper connected to the motor 1110 at a first wiping speed. In a second switching position II of the controller 1120, the controller 1120 connects the battery voltage contact 153 to the second voltage connection 53*b* of the motor 1110. In the second switching position II, the motor 1110 therefore runs at a second speed, which may be higher than the first speed. Further switching states for further speeds may also be provided.

When the controller 1120 is toggled to a third switching state O, in order to disconnect the motor 1110 and the windshield wiper driven by the motor, the parking position disk 1240 is generally in an angular position in which the first sliding contact 1210 and the second sliding contact 1220 are electrically insulated from one another. In this angular position of the parking position disk 1240, the return line connection 31*b* is thus not connected to the ground connection 31. This can be determined by the controller 1120. So long as the return line connection 31*b* is not connected to the ground connection 31, the controller 1120 maintains an electrical connection between the battery voltage contact 153 and the first voltage connection 53 of the motor 1110. This has the result that the motor 1110 continues to run and continues to drive the shaft 130, so that the parking position disk 1240 continues to rotate until the first sliding contact 1210 and the second sliding contact 1220 of the internal switch 1200 come into contact with the contact area 1250 and are thereby shorted. In this angular position of the parking position disk 1240, the return line connection 31*b* is concomitantly pulled to the potential of the ground connection 31. This is determined by the controller 1120, which interrupts the connection between the battery voltage contact 153 and the first voltage connection 53. As a result, the motor 1110 and the windshield wiper driven by the motor stop. The contact area 1250 is arranged on the parking position disk 1240 such that the angular position of the parking position disk 1240 in which the sliding contacts 1210, 1220 are shorted arises precisely when the windshield wiper driven by the motor 1110 is in a parking position. When the windshield wiper is disconnected, it is therefore first of all put into the parking position before it is actually disconnected. If the internal switch 1200 is designed such that the sliding contacts 1210, 1220 are shorted together in all positions of the parking position disk 1240 apart from the parking position, the controller 1120 is accordingly designed to recognize when the short circuit is broken.

During operation of the motor 1110 in switching position I or II of the controller 1120, the parking position disk 1240 results in an electrical connection being periodically made and broken between the return line connection 31*b* and the ground connection 31, as a result of which the return line connection 31*b* and lines connected to the return line connection experience periodic voltage pulses. Such a voltage pulse arises once for every revolution of the parking position disk 1240.

In accordance with the invention, it has been recognized that these periodic voltage pulses on the return line connection 31*b* result in emission of electromagnetic interference in a frequency range up to a few hundred MHz. Therefore, the return line connection 31*b* and the ground connection 31 again have a filter element 400 provided between them which is preferably in the form of a capacitor having a capacitance of a few nF. Experiments have shown that the filter element 400 can effectively suppress the interference emissions described. Again, it is advantageous if the filter element 400 is arranged as close as possible to the internal switch 200, and as close as possible to the sliding contacts 1210, 1220 when the internal switch 1200 is designed with a parking position disk 1240 and sliding contacts 1210, 1220.

Figure 4:
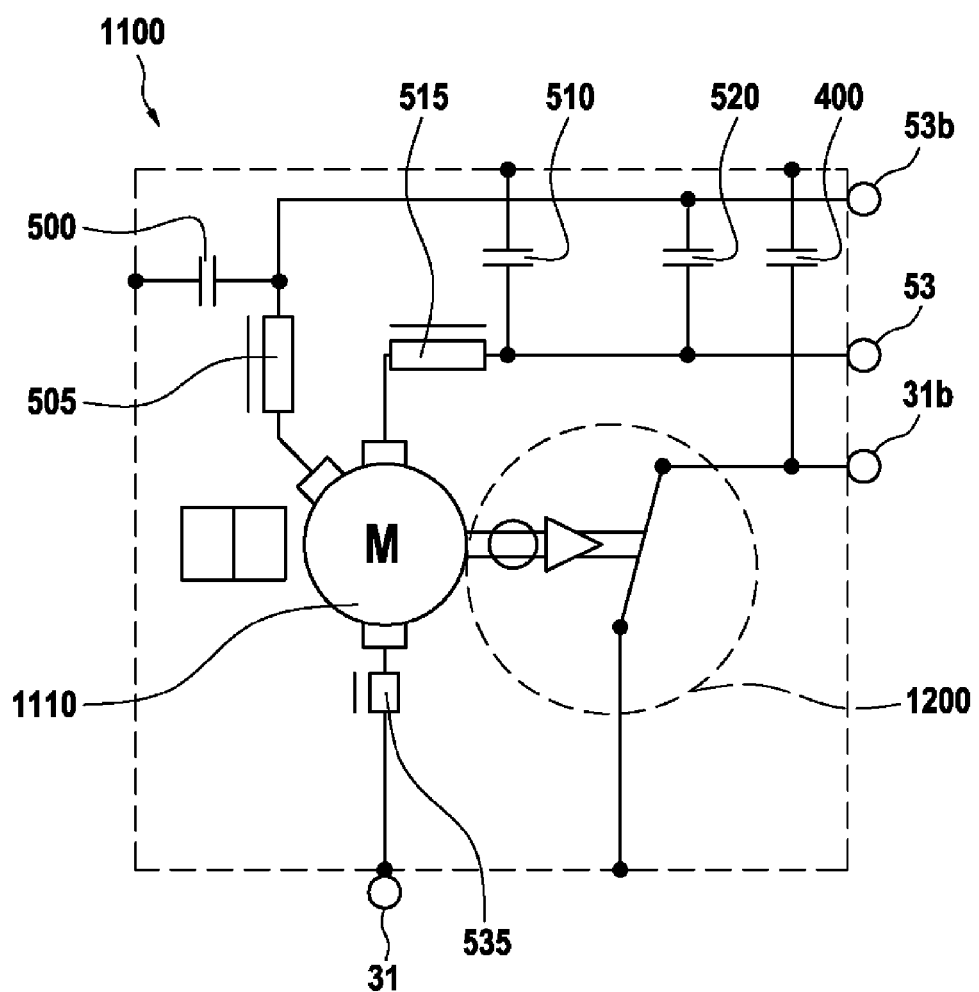
FIG. 4 shows a further illustration of the circuit arrangement based on the second embodiment.

FIG. 4 shows a further view of the circuit arrangement 1100 in the second embodiment. FIG. 4 shows that the circuit arrangement 100 may have further interference suppression elements. Thus, a first capacitor 500 is again provided between the second voltage connection 53*b* and the ground connection 33. The motor 1110 and the second voltage connection 53 have a first inductor 505 arranged between them. The first voltage connection and the ground connection 33 have a second capacitor 510 provided between them. A second inductor 515 is between the motor 1110 and the first voltage connection 53. A third capacitor 520 connects the first voltage connection 53 and the second voltage connection 53b. A third inductor 535 is provided between the motor 1110 and the ground connection 31. The provision of the capacitors 500, 510, 520 and the inductors 505, 515, 535 is already known from the prior art.

Figure 5:
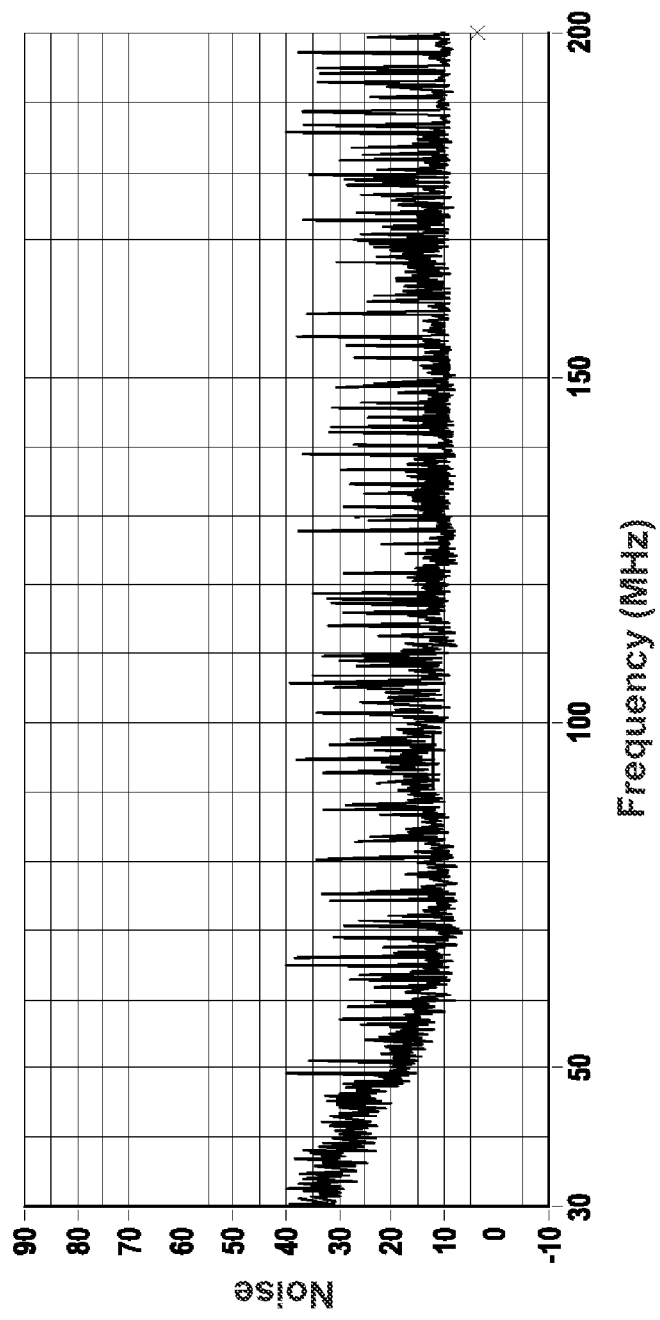
FIG. 5 shows a noise spectrum based on the prior art.

FIG. 5 shows a schematic illustration of a noise spectrum for the circuit arrangement 100 in the first embodiment without the filter element 400. Frequencies in the range between 30 MHz and 200 MHz are plotted on the right. A noise amplitude in arbitrary units is shown upwards. By way of example, the graph in FIG. 5 can be recorded using a spectrum analyzer or an RF test receiver. FIG. 5 shows that the circuit arrangement 100 without the filter element 400 causes severe noise in the range between 50 MHz and upwards of 200 MHz. This becomes clear from a few spikes in the graph shown. A more precise analysis of the noise spectrum also shows that the interference is distributed continuously over the entire frequency range and is not of a discrete nature.

Figure 6:
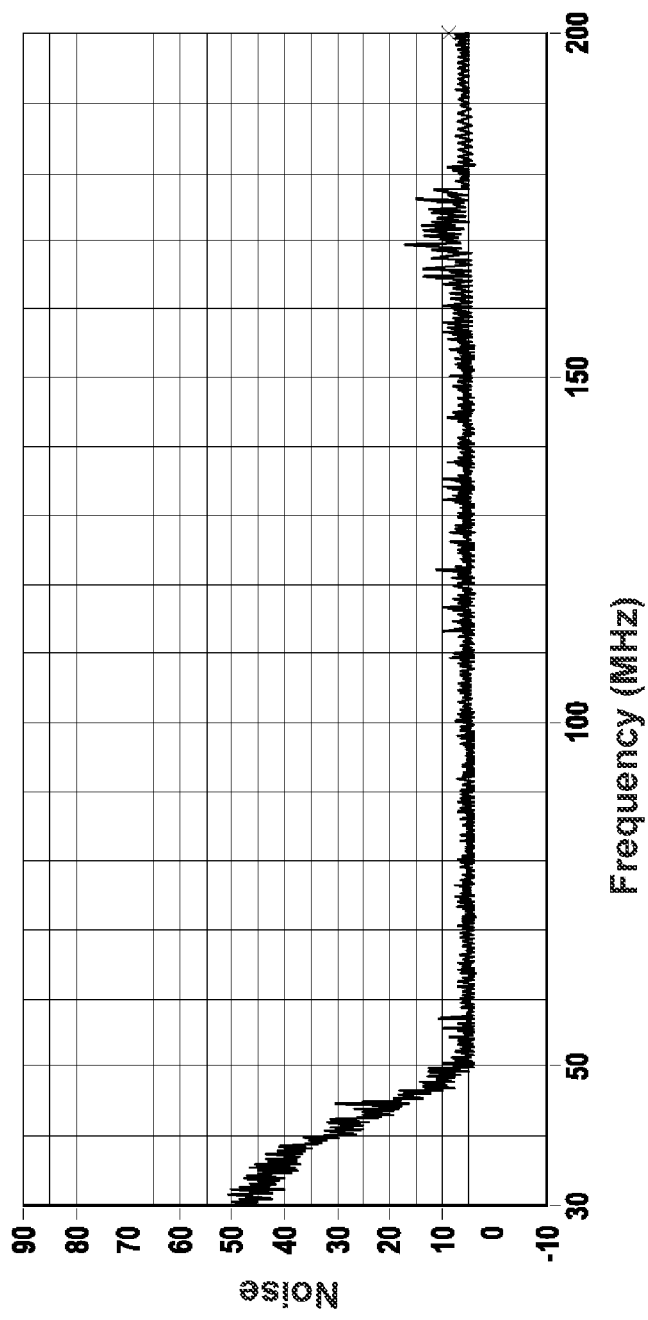
FIG. 6 shows a noise spectrum for an improved circuit arrangement.

FIG. 6 shows a schematic illustration of a noise spectrum 100 for the first embodiment with the filter element 400. Again, frequencies in the range between 30 MHz and 200 MHz are plotted on the right. The measured noise amplitude in arbitrary units, but units which are comparable with those in FIG. 5, is shown upwards. FIG. 6 clearly shows that the noise pulses in the range between 50 MHz and 200 MHz are greatly reduced by the use of the filter element 400.

The invention claimed is:

1. A circuit arrangement for operating an electric motor, wherein the electric motor has a first voltage connection, a ground connection, and a return line connection, wherein the ground connection is connected to a battery ground connection on a battery, the circuit arrangement comprising:
   wherein a switch is provided configured to open or break a conductive connection between the ground connection and the return line connection on the basis of an angular position of a shaft driven by the electric motor, and
   a capacitor is arranged directly between the return line connection and the ground connection.

2. The circuit arrangement as claimed in claim 1, wherein the capacitor has a capacitance of between 1 nF and 100 nF.

3. The circuit arrangement as claimed in claim 1, wherein the electric motor includes a rotary motor.

4. The circuit arrangement as claimed in claim 1, wherein the electric motor has a limit stop connection which is connected to a battery voltage contact, wherein the internal switch is designed to connect the return line connection either to the ground connection or to the limit stop connection on the basis of the angular position of the shaft.

\* \* \* \* \*